United States Patent [19]

Hosoda et al.

[11] Patent Number: 4,943,934

[45] Date of Patent: Jul. 24, 1990

[54] PICTURE OPERATION UNIT FOR PERFORMING OPERATIONS ON INTENSITY DATA OF NEIGHBORING PICTURE ELEMENTS

[75] Inventors: Makoto Hosoda; Toshio Shiomi, both of Shizuoka, Japan

[73] Assignee: Hamamatsu Photonics Kabushiki Kaisha, Shizuoka, Japan

[21] Appl. No.: 128,187

[22] Filed: Dec. 3, 1987

[51] Int. Cl.$^5$ .............................................. G06F 15/66
[52] U.S. Cl. ...................................... 364/518; 382/27
[58] Field of Search .................. 364/518, 521; 382/19, 382/27, 47

[56]  References Cited

U.S. PATENT DOCUMENTS

| 4,513,440 | 4/1985 | Delman | 382/30 |
| 4,630,307 | 12/1986 | Cok | 382/27 X |
| 4,667,295 | 5/1987 | Preston, Jr. | 382/27 X |
| 4,680,720 | 7/1987 | Yoshii et al. | 364/521 |
| 4,703,513 | 10/1987 | Gennery | 382/27 |

FOREIGN PATENT DOCUMENTS

| 0068678 | 1/1983 | European Pat. Off. |
| 1365838 | 9/1974 | United Kingdom . |
| 2061660 | 5/1981 | United Kingdom . |
| 2180125 | 7/1985 | United Kingdom . |

Primary Examiner—Gary V. Harkcom
Assistant Examiner—Mark K. Zimmerman
Attorney, Agent, or Firm—Finnegan, Henderson, Farabow, Garrett, and Dunner

[57]  ABSTRACT

A neighboring picture operation unit for carrying out data operations on a plurality of picture elements having multilevel intensity information having a neighboring picture element register for storing the data corresponding to the intensity information for each picture element, a bit selector for selecting all the bits corresponding to a specific bit position of the intensity information for each of the picture elements, and a bit operator for performing the operations on the data corresponding to a bit position in accordance with the results of operations performed on data corresponding to other bit positions. The bit operator has a programmable logic array (PLA) for performing AND operations on groups of data corresponding to a specific bit position and patterns of bits generated by a ROM in response to previous comparisons of picture data corresponding to a specific bit position. The operations performed may for example include the determination of the highest intensity picture element from a two dimensional grouping of picture elements.

1 Claim, 5 Drawing Sheets

PICTURE OPERATION UNIT FOR PERFORMING OPERATIONS ON INTENSITY DATA OF NEIGHBORING PICTURE ELEMENTS

BACKGROUND OF THE INVENTION

The present invention relates to a neighboring picture operation unit for carrying out arithmetic processing with respect to picture elements adjacent to each other.

Specifically, this invention relates to a calculating device for calculating the position of the maximum intensity pixel in the neighboring pixels, and for determining the relationship between the position and intensity of the pixels of the image, such as the order of the intensity or the like. Accordingly, the data thus obtained is a (X, Y) coordinate representing the position and the intensity (light and shade) of the image such as an intensity distribution or the like.

The neighboring picture element (neighboring pixel) is defined by the pixel which exists in the neighborhood of a noticed pixel in the center as shown in FIG. 1 attached to this letter. The selection of the neighboring pixel is varied with application fields. For example, frequently the neighboring pixels are selected from the immediate neighborhood of the noticed pixel as shown in FIG. 2.

The noticed pixel is arbitrarily selected, and therefore all of the pixels of an image have their neighboring pixels. Using arbitrarily selected noticed pixels and the respective neighboring pixels thereof, for example, this invention can determine a distribution in light and shade of an image such as a streak image or the like.

Conventionally, in a neighboring picture operation unit for a picture presented with light and shade, the system carrys out operations on intensity information on the light and shade in the vicinity of the picture.

This processing of picture elements is carried out by a combination of binomial operations on intensity information for those picture elements as illustrated by FIG. 2. Binominal operations include both Boolean operations such as AND, OR, COMPARE or the like and arithmetic operations such as ADD, SUB or the like. The shade information on the light and shade of each picture element is represented by a binary code. In this case, it is defined that the higher the bit position of the bit having a "1" the higher the intensity of a picture element. FIG. 2 shows an example of a circuit for carrying out processing for eight picture elements by a combination of binomial operations an intensity information of the picture elements. The shade of each picture element is represented by digital code (binary code). The binary code representing the intensity of each picture element (1–8) is inputted to one of input terminals of each comparator, and compared with the other binary code of adjacent picture element inputted to the same comparator to thereby output the binary code having a "1" in the highest bit position thereof. At the same time, the position of the picture element of the binary code having "1" in the higher figure in each comparator is detected or memorized by position detecting means (not shown). At the next stage, a pair of the binary codes outputted from the compartor and the adjacent comparator thereto are inputted to another comparator and compared with each other, thereby to output the binary code having "1" in the higher bit position thereof and detect the position of the picture element. The above operation is repeated a number of times to determine the picture element binary code having "1" in the highest bit position thereof and detect its position.

In this system, however, if information as to the relation of intensity information among a group of neighboring picture elements is to be obtained, it is necessary to change the processing procedure in various manners. For example, there are disadvantages in using one and the same operation to obtain information on the position of a picture element having the largest intensity among numbers of input picture elements, the position of a picture element having the smallest intensity, the position of a picture element having the intermediate intensity, the position of a picture element of a having a desired intensity and so on.

SUMMARY OF THE INVENTION

It is therefore an object of the present invention to provide a neighboring picture operation unit which can process a plurality of simultaneously input picture elements represented with light and shade all at once.

In order to attain the above object, according to the present invention, the neighboring picture operation unit for carrying out a data operation on a plurality of picture elements having multilevel intensity information obtained from a picture, comprises a neighboring picture element register provided correspondingly to a plurality of picture elements contained in a processing unit for latching data of every picture element, a bit selector for reading out the data from the neighboring picture element register by every bit section successively, and a bit operator for performing operation on all the data contained in the read-out bit section in parallel, and for determining a conditions of operation for the next bit section in accordance with the result of the previous operation so as to repeat the operation.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the neighboring picture operation unit comprises a register means for storing data corresponding to intensity information of the picture elements stored in the picture memory, a bit selector for reading out data from said register for each of the plurality of picture elements according to a selected bit position of the data in the picture memory, and a bit operator for performing the data operations on the data corresponding to the selected bit position, the bit operator performing the operations on the data corresponding to the selected bit position in accordance with the correspondence to other bit positions of the stored data and the register means.

The accompanying drawings, which are incorporated in and constitute part of this specification, illustrate one embodiment of the invention and, together with the description, serve to explain the principles of the invention.

DETAILED DESCRIPTION OF THE PREFERRED EMBODIMENT

Figure 1A:
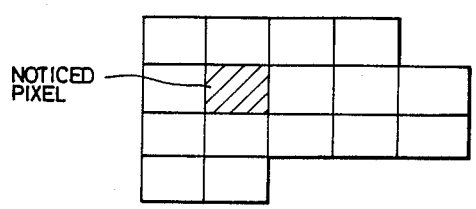
FIG. 1A–1B are illustrations of pixels or picture elements in a portion of a picture.
Figure 1B:
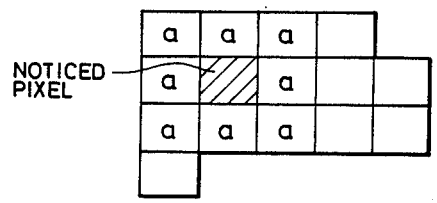

Referring to the drawings, the present invention will be described hereinunder in detail.

Figure 3:
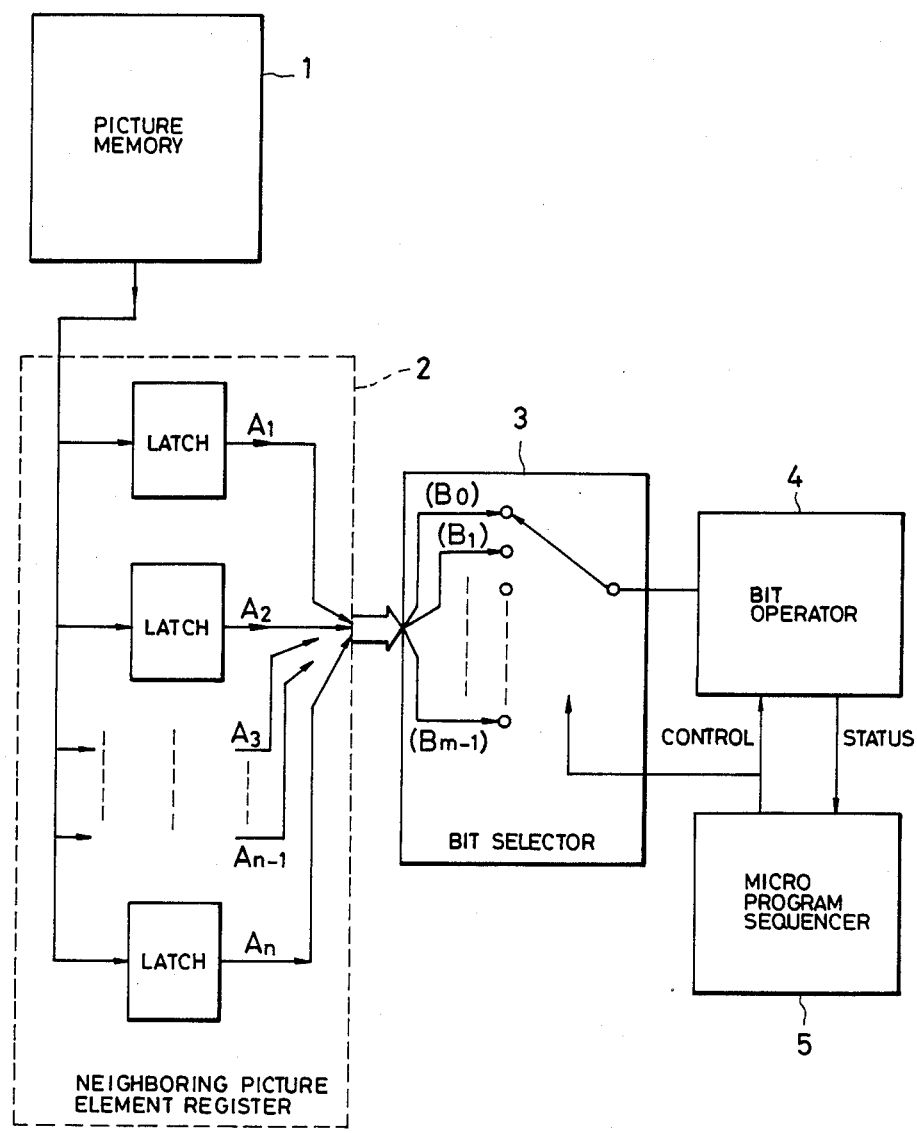
FIG. 3 is a block diagram showing an embodiment of the neighboring picture operation unit according to the invention.

FIG. 3 is a block diagram showing am embodiment of the neighboring picture operation unit according to the present invention. Binary data in which shade information of adjacent picture elements to be operated on are taken from a picture memory 1 into a neighbor picture element register (latches) 2 to be latched therein. Assume here that the number of the neighboring picture elements is n and each picture element is represented by m binary bits, where n and m are integers. Specifically, the data of the plurality of neighboring picture elements read out of the picture memory 1 are latched in the neighboring picture element register 2 made up of n registers.

In accordance with instructions from a microprogram sequencer 5, a bit selector 3 connects the outputs $A_1$-$A_n$ of the neighboring picture element register 2 to a bit operator 4 by a bit section of the corresponding bits of the respective picture elements succesively one by one. That is, the group of n corresponding bits, for example, a group of the n respective MSBs, a group of the n respective succeeding bits, a group of the n respective further succeeding bits, ..., from the registers of the neighboring picture element register 2 are successviely connected to the bit operator 4. For example, in the case where n=9, there are 16 bits of intensity information, and the bit section of the respective bits located in the sixth bit position of the 16 bits corresponding to intensity information is selected by the bit selector 3, the following data is transferred into the bit operator 4. The nine bits consisting of the sixth bit of the output $A_1$, the sixth bit of the output $A_2$, ..., and the sixth bit of the output $A_9$, are applied to the bit operator 4.

Both parallel and serial operations (transmissions) can be performed by this invention. For the parallel operation between picture memory 1 and neighboring picture element register 2, the bus width (L) is equal to n×m, where L : number of total lines to connect the picture memory to the neighboring picture element register 2, n : number of the neighboring picture elements, and m : number of the binary bits representing the light and shade of each neighboring picture element.

Where serial lines are linked to each picture element storage location, the bus width(L) is equal to n. In this case, binary bits in the same bit section of the respective neighboring picture elements may be parallely and serially transmitted to the respective latches by a clock signal (not shown). The above transmission is repeated m-times to transmit all binary bits of the respective neighboring picture elements to the latches ($A_1$-$A_n$).

Similarly, in a case where the bus width is equal to m, the transmission of the binary bits (m) of a neighboring picture element to the corresponding latch is repeated n-times.

For the transmission of the binary bits of the neighboring picture elements to the bit selector 3, the parallel and serial opertions as described above can be used.

Figure 4:
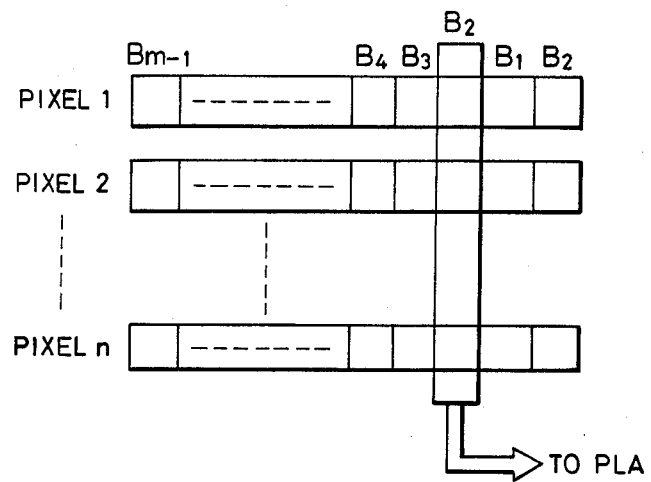
FIG. 4 is an illustration of the bits transmitted to the PLA by the bit selector of the present invention.

FIG. 4 shows an example of the bit selector 3. Assuming that a bit section $B_2$ (a bit plane toward intensity depth) is selected, outputs of the bit selector may be parallely or serially transmitted to the PLA. For the parallel and serial transmissions, the bus width is equal to n and 1, respectively.

Figure 5:
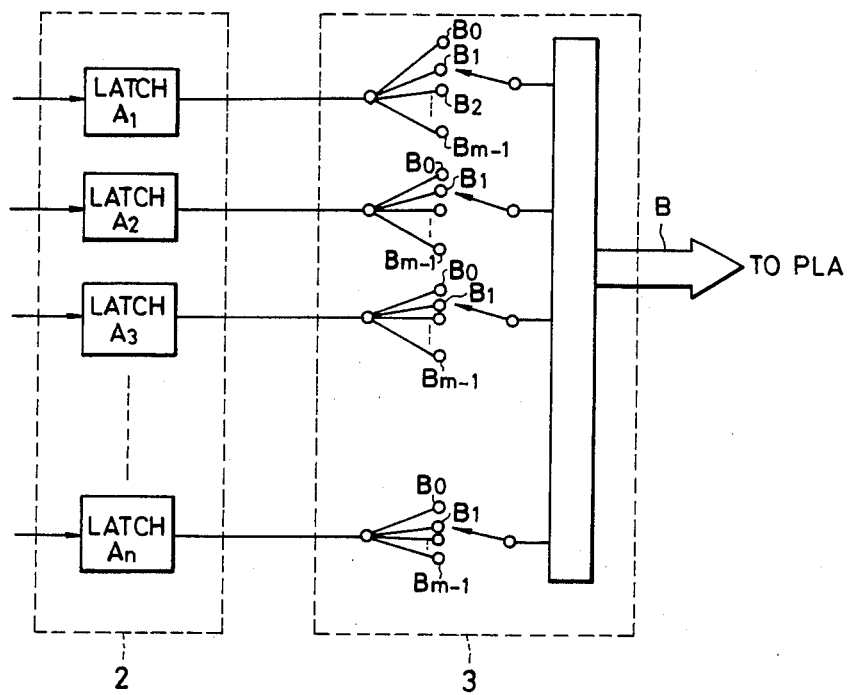
FIG. 5 is an illustration of an alternate embodiment of the bit selector.

FIG. 5 shows another example of bit selector 3. The bus "B" as shown in FIG. 5 may be n lines wide for parallel transmission or 1 line for serial transmission.

Figure 6:
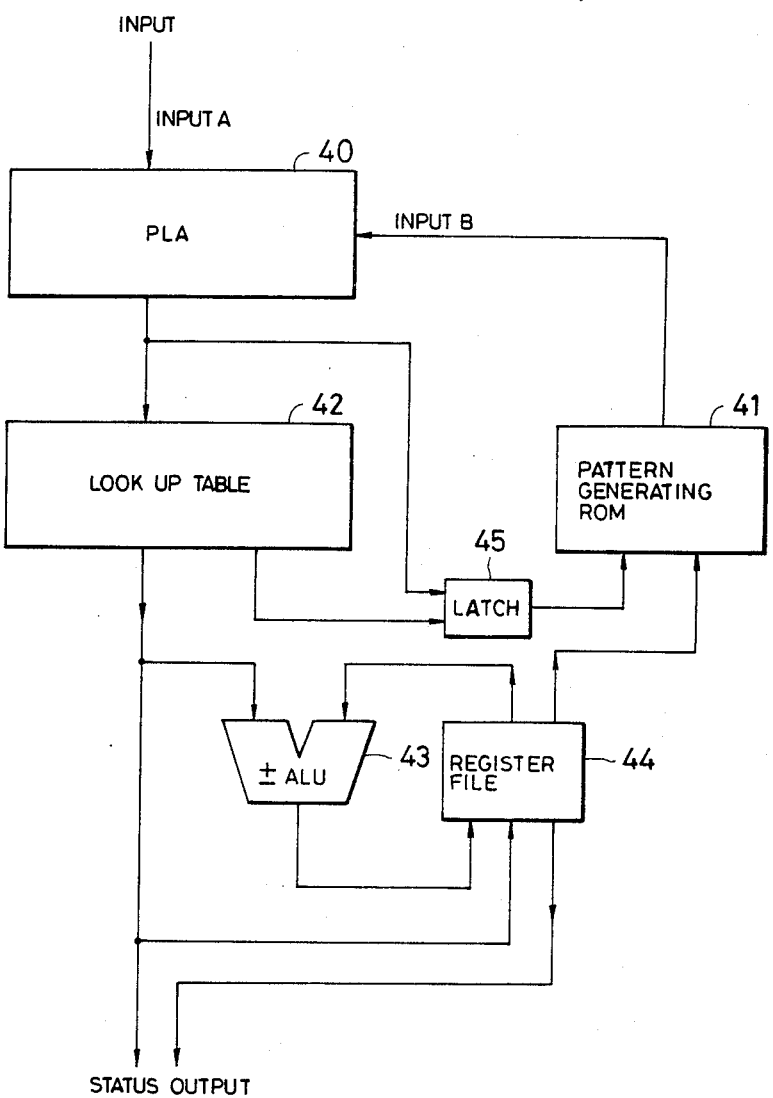
FIG. 6 is a block diagram showing an embodiment of the bit operator of the above-mentioned neighboring picture operation unit.

FIG. 6 is a block diagram showing an embodiment of bit operator 4. The bit operator 4 is comprised of a PLA (programmable logic array) 40, a pattern generating ROM 41, a look-up table 42, an arithmetic/logic unit 43, a register file 44 and a latch 45, so that with respect to a row of parallelly or serially input bits, the number and positions of bits equal to "1" in the input data, the bit matching pattern, etc. can be calculated. The PLA 40 has a ROM having programmable addresses. The PLA 40 carries out logic operations for the bit pattern produced by the pattern generating ROM 41 and the input bit section (i.e., ANDing and ORing every bit). The logic operation of PLA 40 is controlled by the ROM 41 or an independent microcomputer (not shown). The look-up table 42 performs calculation of the number of "1"'s in the output bit row of the PLA 40, detection of the bit positions of the bit row, pattern matching, and so on. The latch 45 is arranged to temporarily store bit rows from the PLA 0 and the look-up table 42 and selectively output one of the bit rows according to the operation that the user would like performed. The resultant bit row or numerical results are fed back to the pattern generating ROM 41. The pattern generating output of the pattern generating ROM 41 is controlled also by the output of the register file 44.

Figure 7:
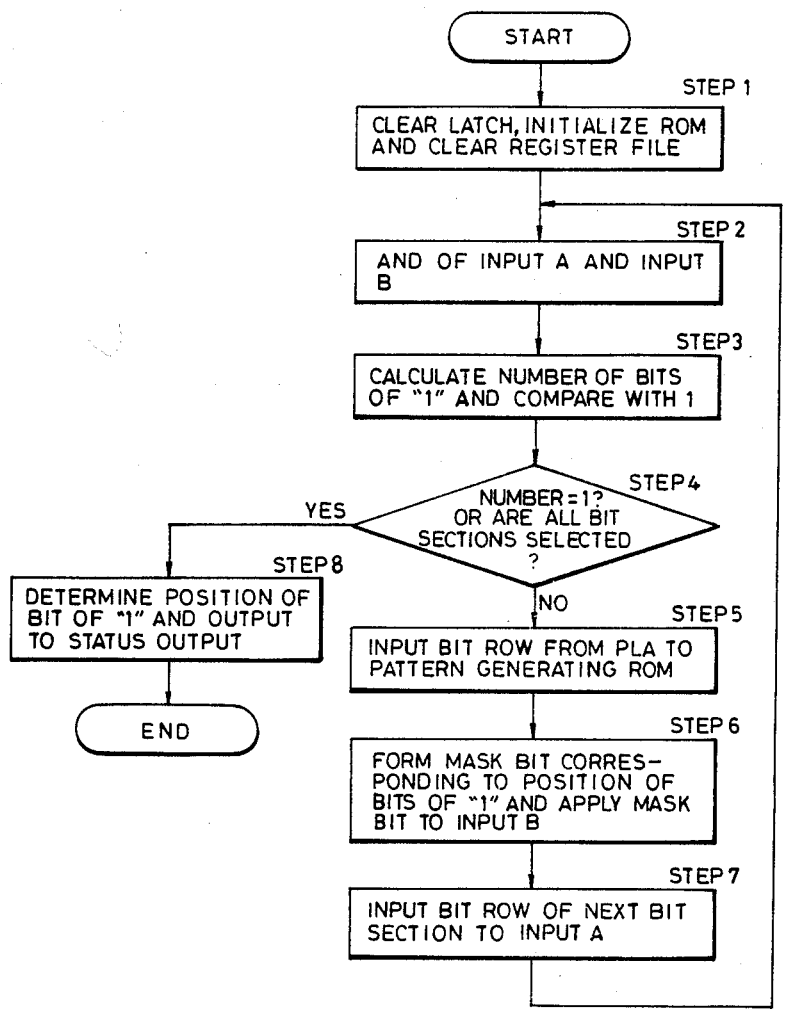
FIG. 7 is a flow chart illustrating an operational example of the invention.

An example of an operation wherein the position of the picture element having the largest value of intensity data in a 3×3 grid of neighboring picture elements is detected is described hereinunder with reference to a flow-chart as shown in FIG. 7. For this operation, the latch 45 is set to output the bit row from the PLA 40 to the ROM 41. In FIG. 3, assuming that n=9 and m=16, all of the bit rows representing intensity of the picture elements constituting the 3×3 grid of neighboring picture elements is latched in the neighboring picture element register 2. Thereafter, the following operation and determination are carried out by the bit operator 4 while descending the position of the bit section from the 15th bit section, i.e., a 9 bit data row having the most significant bit from the intensity information of the 9 neighboring picture elements, to the 0th bit section from bit selector 3.

Figure 2:
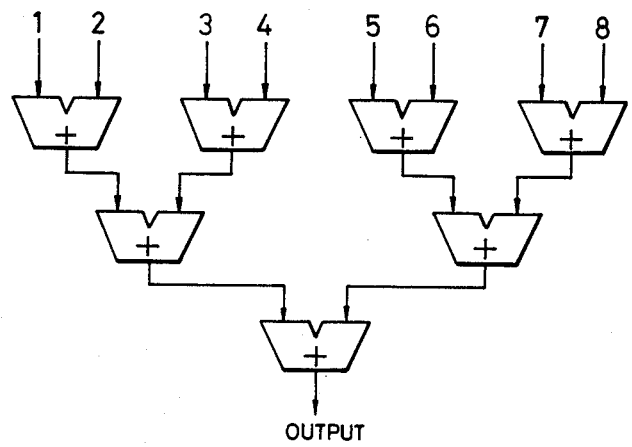
FIG. 2 is a block diagram showing an example of a conventional neighboring picture operation unit.

Step: 1: The latch 45 is cleared or initialized and a bit row "111111111" is applied to the input B of the PLA 40 from the pattern generating ROM 41 (see FIG. 2). The register of the register file 44 is also cleared.

Step 2: An AND operation is performed between the bit row applied to the input A of the PLA 40 and the data "111111111" applied to the input B of the PLA 40.

Step 3: The number of bits equal to "1" in the result of the AND operation is calculated by using the look-up table 42 and comparing with a numerical value of "1" in the ALU 43.

Step 4: If the sum is "1" or the selection has been completed to the 0th bit section, operation jumps to step 8. If the sum is "1" then a "1" exists in only one picture element at the bit position or section tested while the remaining picture elements have a "0" at that bit position. Thus the maximum picture element has been determined.

Step 5: The output of the latch 45, that is the bit row input to the latch 45 from the PLA 40, is applied to the pattern generating ROM 41.

Step 6: A bit pattern (mask bits) having bits of "1" only at the bit positions which were equal to "1" at the PLA output is generated and applied to the input B of the PLA 40.

That is, thereafter, only the bit positions having "1" in the data output from the PLA are considered in subsequent execution of the above steps.

Step 7: A bit section descended by one bit is selected by the bit selector 3 and applied to the input A of the PLA 40.

Step 8: The bit positions of "1" are detected by the look-up table 42 and the result is output to the status output. The steps 2 and 5 correspond to an ordinary masking operation, that is, the AND operation between input data and mask bits and the bit mask forming operation, respectively. In such a manner as described above, the various operations as to the intensity information among picture elements can be processed in parallel.

If, for example, the three most significant bits of the nine neighboring picture elements' intensity information data were 001, 110, 000, 111 and the five other intensity data words had 000 for the three most significant bits. The bit section corresponding to the most significant bit would be equal to 010100000. The output of PLA 40 after Step 1 and Step 2 are executed would be 010100000. The output of the PLA would then be input to the latch 45 and Look-up Table 42 wherein the Look-up Table 42 would calculate the number of ones and output the number 0010, the binary representation for two. In Step 4 the number would be determined not to be one and since we are calculating the bit section of the most significant bit, all bit sections would not have been selected therefore the next step would be Step 5. The pattern generating ROM 41 uses the contents of latch 45 which are the output of the PLA 40 as an input to input B of PLA 40 according to Step 6. In Step 7 the next bit section is input to input A of PLA 40 which in this example would be 010100000.

In Step 2, the AND operation would then be performed on input A and input B. The result of this operation would be the same as for the first bit section operated upon and therfore Steps 3 through 6 would be performed in exactly the same manner as for the last bit section.

In Step 7 the next in the descending line of bit sections would be taken from the bit selector 3. This bit section would equal 100100000. PLA 40 would perform the AND operation on input A and input B wherein input A would be the bit section and input B would be 010100000. The result of the AND operation would be 000100000. In Step 3 the Look-up Table 42 would calculate the number of bits and in Step 4 would be determined by ALU 43 that there is only one bit having a value of "1". Therefore, Step 8 would be executed wherein it would be determined that the fourth picture element has the highest value of intensity information.

As described above in detail, according to the present invention, the neighboring picture operation unit for carrying out a data operation on a plurality of picture elements having binary coded multilevel intensity information obtained from a picture, is comprised of a neighboring picture element register provided correspondingly to a plurality of picture elements contained in a processing unit for latching data of every picture element, a bit selector for reading out the data from the neighboring picture element register by successive bit sections, and a bit operator for performing operation on all the data contained in the read-out bit section in parallel, and for determining a condition of operation for the next bit section in accordance with the result of the previous operation so as to repeat the operation. The processor according to this invention can sort the order of the intensity magnitude of pixels and output the order or the magnitude relations in order to search or select a maximum or minimum intensity pixel from an image area.

According to the present invention, therefore, the following effects can be obtained:

(a) Compared to the conventional operators, the operation for obtaining the relation of light and shade information of picture elements can be carried out generally by one and the same operator;

(b) Compared to the conventional operators, the number of steps of the above-mentioned operation is extremely small so that the operation can be made at a high speed; and (c) Compared to the conventional operators, the operator is simple in circuit arrangement and therefore the number of parts can be minimized.

It will be apparent to those skilled in the art that various modifications and variations can be made in the neighboring picture operation unit of the present invention without departing from the scope or spirit of the invention. Thus, it is intended that the present invention cover the modifications and variations of this invention provided they come within the scope of the appended claims and their equivalents.

What is claimed is:

1. A neighboring picture operation unit for carrying out data operations on data for a plurality of picture elements stored in a picture memory, comprising:

a register means for storing a predetermined amount of data corresponding to intensity information of the picture elements stored in the picture memory;

a bit selector for reading out data from said register means for each of the plurality of picture elements according to a selected bit position of the data in the picture memory; and a bit operator for performing the data operations on the data corresponding to the selected bit position including a programmable logic array for performing binomial operations in parallel on said data corresponding to the selected bit position, said programmable logic array having an output, a first input and a second input, said first input connected to the output of said bit selector, a pattern generating read only memory for generating a sequence of bits and for applying the bits generated to said second input of the programmable logic array, a look-up table for detecting a condition at the output of said programmable logic array and generating a value corresponding to the detected condition, and an arithmetic and logic unit for comparing said value generated by said look-up table to a value corresponding to the result of the operation performed on the plurality of picture elements stored in said register means, said bit operator performing said operations on said data corresponding to said selected bit position in accordance with data corresponding to other bit positions of the stored data in said register means.

* * * * *